United States Patent
Guo et al.

(10) Patent No.: US 7,595,956 B2
(45) Date of Patent: Sep. 29, 2009

(54) MICROACTUATOR REFERENCE INPUT LIMIT TO PREVENT INTERNAL STATES OVER-ACCUMULATION

(75) Inventors: Wei Guo, Fremont, CA (US); Xiaoping Hu, Milpitas, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 3 days.

(21) Appl. No.: 12/006,329

(22) Filed: Dec. 31, 2007

(65) Prior Publication Data

US 2009/0168232 A1 Jul. 2, 2009

(51) Int. Cl.
G11B 5/596 (2006.01)

(52) U.S. Cl. .................... 360/78.05; 360/78.12

(58) Field of Classification Search .......... None
See application file for complete search history.

(56) References Cited

U.S. PATENT DOCUMENTS

| | | | |
|---|---|---|---|
| 6,088,187 | A | 7/2000 | Takaishi |
| 6,298,545 | B1 * | 10/2001 | Mohajerani et al. ...... 29/603.03 |
| 6,465,981 | B2 | 10/2002 | Zhang et al. |
| 6,490,119 | B1 | 12/2002 | Mittal et al. |
| 6,590,734 | B1 | 7/2003 | Ell |
| 6,747,836 | B2 | 6/2004 | Stevens et al. |
| 6,975,482 | B1 | 12/2005 | Guo et al. |
| 7,009,804 | B2 | 3/2006 | Sharma et al. |
| 7,038,876 | B2 | 5/2006 | Morris |
| 7,145,745 | B1 | 12/2006 | Shepherd et al. |
| 7,173,790 | B2 | 2/2007 | Kobayashi et al. |
| 2006/0039079 | A1 * | 2/2006 | Kobayashi et al. ....... 360/78.05 |

FOREIGN PATENT DOCUMENTS

EP 0977181 2/2000

OTHER PUBLICATIONS

Takaishi, et al., "Microactuator Control For Disk Drive", *IEEE Transactions on Magnetics*, vol. 32, No. 3, (May 1996),1863-1866.
Zhang, et al., "Modified Adaptive Feedforward Runout Compensation for Dual-Stage Servo System", *IEEE Transactions on Magnetics*, vol. 36, No. 5, (Sep. 2000),3581-3584.
Kobayashi, et al., "Track Seek Control for Hard Disk Dual-Stage Servo Systems", *IEEE Transactions on Magnetics*, vol. 37, No. 2, (Mar. 2001),949-954.
Li, et al., "A Nonlinear Control Scheme Applied to Track-Seeking in Hard Disk Drive Dual Stage Servo System", *IEEE*, (2003),962-965.
Horowitz, et al., "Design, Fabrication and Control of Micro-Actuators for Dual-State Servo Systems in Magnetic Disk Files", *Computer Mechanics Laboratory; Department of Mechanical Engineering/ University of California at Berkeley*, CA, (2006),1-35.

* cited by examiner

Primary Examiner—Andrew L Sniezek

(57) ABSTRACT

A microactuator reference limit used to prevent over-accumulation of internal states may be set based on the microactuator's mechanical properties and is applied at the reference point to the microactuator servo subsystem. A microactuator variable input limit to prevent over-accumulation of internal states may be dynamically determined based on the difference between a signal corresponding to the maximum physical stroke of the microactuator and an estimated motion of the microactuator. Either configuration of servo system automatically ensures that all the internal states of the microactuator controller will not over-react and cause excessive overshoot, sluggish response, and/or saturation.

6 Claims, 7 Drawing Sheets

IN A SECONDARY ACTUATOR SERVO LOOP, GENERATING A SECONDARY ACTUATOR CONTROLLER INPUT SIGNAL BASED ON A PRIMARY ACTUATOR CONTROLLER INPUT SIGNAL, AN ESTIMATED SECONDARY ACTUATOR MOTION SIGNAL, AND A SECONDARY ACTUATOR CONTROLLER REFERENCE LIMIT;

WHEREIN THE REFERENCE LIMIT CORRESPONDS TO THE MAXIMUM PHYSICAL STROKE OF THE SECONDARY ACTUATOR
502

IN THE SECONDARY ACTUATOR SERVO LOOP, SENDING THE SECONDARY ACTUATOR CONTROLLER INPUT SIGNAL TO A SECONDARY ACTUATOR CONTROLLER FOR GENERATING A SECONDARY ACTUATOR CONTROL SIGNAL
504

FIG. 5

IN A SECONDARY ACTUATOR SERVO LOOP, GENERATING A SECONDARY ACTUATOR CONTROLLER INPUT SIGNAL BASED ON A POSITION ERROR SIGNAL, AN ESTIMATED SECONDARY ACTUATOR MOTION SIGNAL, AND A VARIABLE ACTUATOR CONTROLLER INPUT LIMIT;

WHEREIN THE VARIABLE INPUT LIMIT IS BASED ON THE DIFFERENCE BETWEEN A SIGNAL CORRESPONDING TO THE MAXIMUM PHYSICAL STROKE OF THE SECONDARY ACTUATOR AND THE EXTIMATED SECONDARY ACTUATOR MOTION SIGNAL
702

IN THE SECONDARY ACTUATOR SERVO LOOP, SENDING THE SECONDARY ACTUATOR CONTROLLER INPUT SIGNAL TO A SECONDARY ACTUATOR CONTROLLER FOR GENERATING A SECONDARY ACTUATOR CONTROL SIGNAL
704

FIG. 7

MICROACTUATOR REFERENCE INPUT LIMIT TO PREVENT INTERNAL STATES OVER-ACCUMULATION

TECHNICAL FIELD

Embodiments of the invention relate generally to the field of hard disk drives and, more specifically, to a microactuator servo control system.

BACKGROUND ART

Electronic computing devices have become increasingly important to data computation, analysis and storage in our modern society. Modern direct access storage devices (DASDs), such as hard disk drives (HDDs), are heavily relied on to store mass quantities of data for purposes of future retrieval. As such long term data storage has become increasingly popular, and as the speed of microprocessors has steadily increased over time, the need for HDDs with greater storage capacity to store the increased amount of data has steadily increased.

Consequently, there are seemingly constant development efforts to improve the areal density of the media implemented in hard disk drives, where the areal density is measured as the product of bits per inch ("BPI") and tracks per inch ("TPI"). BPI refers to the number of bits that can be written and later reread per linear inch along a track, whereas TPI refers to the number of individual tracks per radial inch. Advancements in areal density result in very narrow data tracks and, therefore, it becomes more and more difficult to align the read/write head accurately on top of the recording track using conventional servos using a voice coil motor ("VCM").

In response, microactuators and associated microactuator servo control systems are being developed wherein operation of both the VCM and the microactuator has a dynamic effect on the present location of the read/write head relative to the storage medium. For example, a microactuator may be mounted between the suspension and the slider to which the read/write head is coupled, allowing one more degree of freedom for the read/write head to travel at great accuracy over the storage medium. The VCM actuator is used to quickly move the read/write head of the HDD servo system to a target track, whereas the microactuator is used to fine-tune the read/write head position when it is getting closer to the target.

However, because microactuators typically have a very limited stroke (e.g., a few tracks), there exists a need to carefully handle microactuator saturation, which is a state in which a microactuator is driven beyond its ability to respond based on its transfer function.

SUMMARY OF EMBODIMENTS OF THE INVENTION

A microactuator reference limit to prevent over-accumulation of internal states is described. The limit at the "reference" point to the microactuator servo subsystem effectively prevents the internal states over-accumulation problem, which would otherwise contribute to microactuator saturation. An associated benefit of such a reference limit in a microactuator servo subsystem is that the reference limit serves as a set-point limit to the microactuator. Thus, the servo system automatically guarantees that all the internal states of the microactuator controller will not over-react, because a relatively large position error signal ("PES") will not even be acknowledged by the controller. Furthermore, the reference may be set based on the microactuator's mechanical properties rather than by trial and error.

A microactuator variable input limit to prevent over-accumulation of internal states is described. The variable input limit is applied in front of the microactuator controller. The input limit is dynamically determined based on the difference between a signal corresponding to the maximum physical stroke of the microactuator and an estimated motion of the microactuator. Thus, the servo system automatically guarantees that all the internal states of the microactuator controller will not over-react, because when the microactuator has a small motion the input limit to the controller is equal to or approximates the maximum physical stroke of the mechanism while gradually decreasing to zero as the estimated motion of the microactuator approaches the maximum physical stroke of the microactuator.

Furthermore, methods are described for controlling a dual-stage actuator comprising a primary actuator and a secondary actuator, based on the reference limit and the variable input limit, respectively.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

FIG. 5 is a flow diagram illustrating a process for controlling a de-coupled dual-stage servo control loop comprising a reference limit, according to an embodiment of the present invention.

FIG. 7 is a flow diagram illustrating a process for controlling a dual-stage servo control loop comprising a variable input limit, according to an embodiment of the present invention.

DETAILED DESCRIPTION

Figure 1:
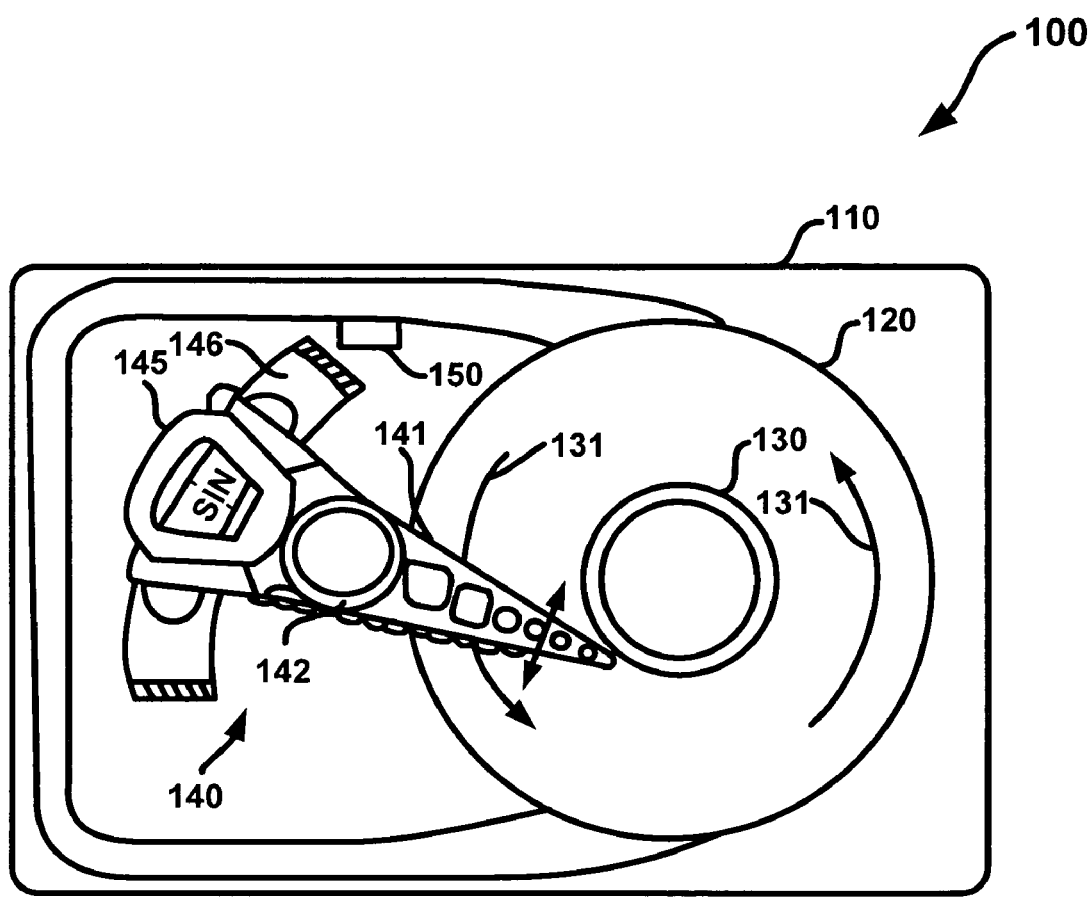
FIG. 1 is plan view of a hard disk drive (HDD), in accordance with an embodiment of the present invention.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

OVERVIEW

Embodiments of the present invention involve servo systems configured to avoid over-accumulation of internal states of a controller of a mechanism whose movement is controlled via the servo system. For example, the mechanism may be a microactuator configured to rotate a slider in a head gimbal assembly (HGA) relative to a magnetic storage medium in a hard disk drive (HDD). Similarly, the servo system may be an associated microactuator servo system, and/or microactuator servo subsystem (i.e., "micro loop") if in a dual stage loop.

According to one embodiment, a reference limit in such a servo system serves as a set-point limit to the mechanism, in that the reference limit corresponds to the maximum physical stroke of the mechanism, thus automatically guaranteeing that all the internal states of the mechanism's controller will not over-react.

According to one embodiment, a variable input limit in such a servo system is applied in front of the mechanism's controller, where the input limit is based on the difference between a signal corresponding to the maximum physical stroke of the mechanism and an estimated motion of the mechanism.

It should be understood by those skilled in the art that various embodiments of the present invention increase the performance quality of a hard disk drive (HDD) because control of the stroke associated with a slider relative to a magnetic storage medium is increased. In this way, the slider is able to more efficiently track concentric data arrays located on a surface of the magnetic storage medium because the slider is provided a more controlled range of motion. Controlling the stroke via either the reference limit or the variable input limit, as described herein, is advantageous in that it combines the advantages of a no input limit configuration, e.g., fast response to an input signal, with the advantage of a constant input limit configuration, e.g., limited overshoot of target track.

Numerous specific embodiments will now be set forth in detail to provide a more thorough understanding of the present technology. The discussion of these detailed embodiments will begin with an overview of a hard disk drive (HDD), and the components connected therein, according to embodiments of the present invention. The discussion will then focus on embodiments of the invention that provide methods for controlling a dual-stage actuator comprising a primary actuator and a secondary actuator, where the dual-stage actuator comprises a primary actuator servo loop for controlling the motion of the primary actuator and a secondary actuator servo loop for controlling the motion of the secondary actuator.

However, it should be understood by those skilled in the art that the present technology may be practiced without the specific details of the embodiments disclosed herein. Additionally, it should be understood that although the microactuator control systems mentioned throughout this detailed description are often described as electronic systems, such control systems may be implemented utilizing hardware alone, or hardware in combination with one or more software modules that have been developed for the purpose of carrying out a task described herein. In other instances, well known methods, procedures, components, and circuits have not been described in detail as not to unnecessarily obscure aspects of the present embodiments.

Furthermore, although embodiments of the present invention will be described in conjunction with a slider in a hard disk drive (HDD), it is understood that the embodiments described herein are useful outside of the art of hard disk drive (HDD) design, manufacturing and operation, such as in those instances when motion needs to be applied to a first object in order to rotate the first object relative to a second object. The utilization of the rotating slider example is only one embodiment and is provided herein merely for purposes of brevity and clarity.

Hard Disk Drive (HDD) Configuration

With reference now to FIG. 1, a schematic drawing of one embodiment of an information storage system comprising a magnetic hard disk file or drive 100 for a computer system is shown. Drive 100 has an outer housing or base 110 containing a disk pack comprising at least one magnetic storage medium 120. A spindle motor assembly having a central drive hub 130 rotates the magnetic storage medium 120 in a circular direction. In this way, the magnetic storage medium 120 is rotated within the outer housing or base 110 by the spindle motor assembly and central drive hub 130 such that data may be read from and written to various points on the surface of the magnetic storage medium 120.

With reference still to FIG. 1, the drive 100 further includes an actuator assembly 140 that comprises one or more parallel actuator arms 141 (one shown) in the form of a comb that is movably or pivotally mounted to the base 110 about a pivot assembly 142. A voice coil 145, free to move within a conventional voice coil motor magnet assembly 146 (top pole not shown), is also mounted to one or more actuator arms 141. In one embodiment, a controller 150 is also mounted to the base 110 for selectively moving one or more parallel actuator arms 141 relative to the magnetic storage medium 120.

Controller 150 comprises programming logic in the form of executable instructions which, when executed, control the movement of the parallel actuator arms 141 relative to the magnetic storage medium 120. Furthermore, controller 150 may comprise programming logic in the form of executable instructions which, when executed, control the movement of microactuator(s) (e.g., microactuator 222 of FIG. 2) associated with the parallel actuator arms 141. Controller 150 may control both the parallel actuator arms 141 and the microactuator(s), or control of the parallel actuator arms 141 and the microactuator(s) may be driven by two or more separate controllers.

Figure 2:
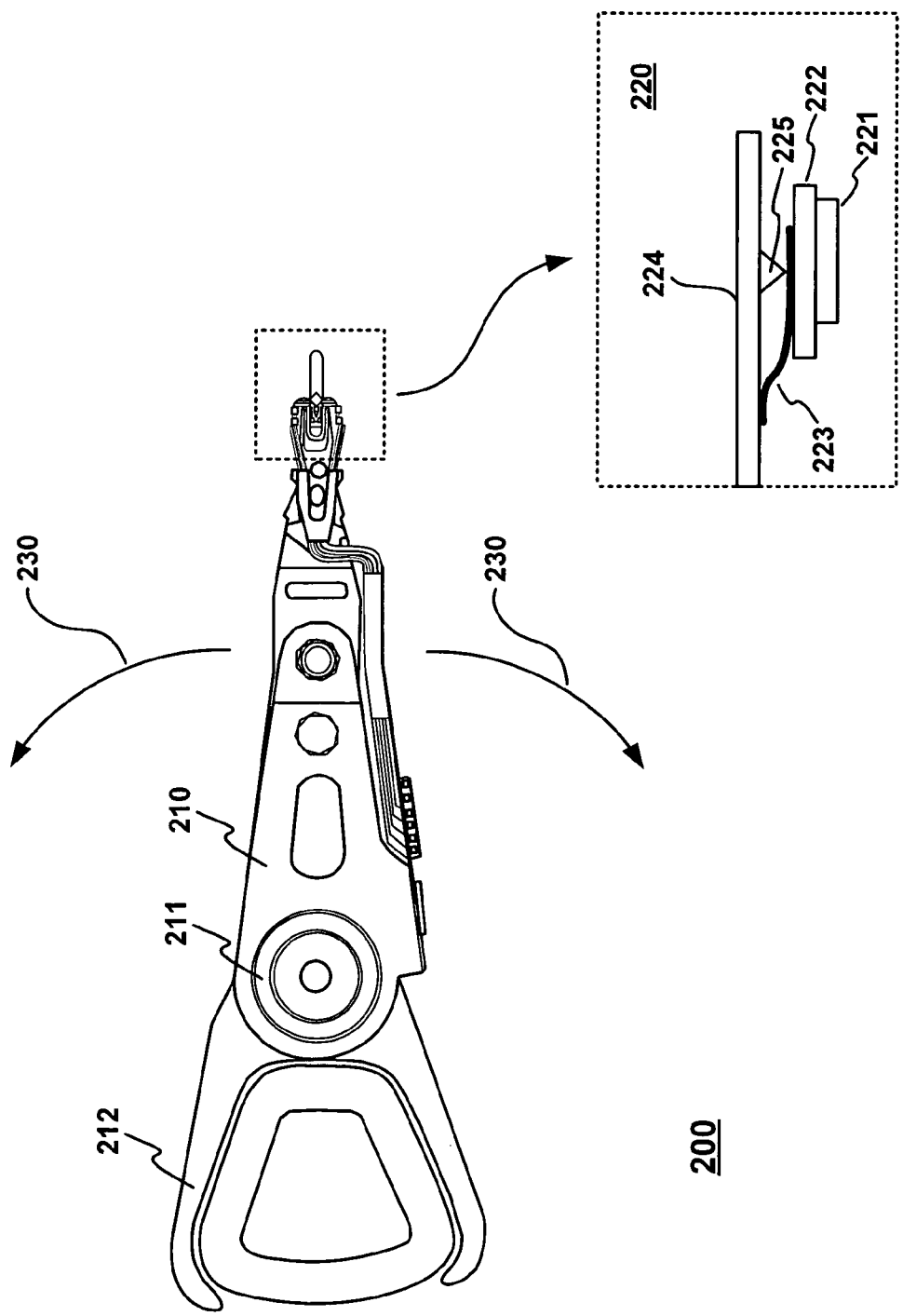
FIG. 2 is an isometric view of an example actuator arm and a magnified, cross-sectional view of a head gimbal assembly (HGA), in accordance with an embodiment of the present invention.

With reference now to FIG. 2, an example actuator arm configuration 200 is shown. An actuator arm 210 is coupled with a head gimbal assembly 220 that comprises a magnetic read/write head (not shown). The magnetic read/write transducer or head is coupled with a slider 221 that is coupled with a microactuator 222. The head gimbal assembly 220 further comprises a flexure 223 coupled with a lead suspension 224 and flexibly mounted to the microactuator 222. In the embodiment shown, the flexure 223 supports the microactuator 222 relative to the lead suspension 224, and a dimple 225 separates the microactuator 222 from the lead suspension 224. Movement (illustrated by arrows 230) of the actuator arm 210 moves the head gimbal assembly 220 relative to the magnetic storage medium 120 such that the read/write head can magnetically read data from and/or magnetically write data to different points along the surface of the magnetic storage medium 120.

However, it should be understood by those skilled in the art that each of the plurality of parallel actuator arms 141 in the drive 100 has its own head gimbal assembly. Thus, in another embodiment, the head gimbal assemblies of the plurality of parallel actuator arms 141 operate in a conventional manner and move in unison with one another, unless drive 100 uses multiple independent actuators (not shown) comprising actuator arms configured to move independently of one another.

It should be further understood by those skilled in the art that the embodiment illustrated in FIG. 2 is exemplary of merely one configuration of a head gimbal assembly 220. For instance, in an alternative embodiment, the head gimbal assembly 220 does not comprise the aforementioned flexure 223, and the microactuator 222 is coupled directly to the lead suspension 224. This configuration may be beneficial in the event that such a flexure 223 is characterized by an inherent degree of flexibility which serves to degrade the stiffness of the head gimbal assembly 220.

In another embodiment, the head gimbal assembly 220 comprises a fixture (not shown), and the fixture comprises a bonding material used to bond the slider 221 to the microactuator 222. For example, the fixture could comprise an adhesive material that is specially designed to bond specific components of a head gimbal assembly such that the fixture is rugged enough to withstand vibrations occurring during disk drive operation so that the components remain bonded together. In yet another embodiment, the fixture is configured to be more or less flexible to compensate for vibrations experienced by the head gimbal assembly 220 during operation of the actuator arm 210 in order to reduce the vibrations exerted on the slider 221 due to the dynamic coupling between the slider 221 and the microactuator 222.

With reference still to FIG. 2, the actuator arm 210 has extending from it at least one lead suspension 224. In one embodiment, the lead suspension 224 is a cantilevered electrical lead suspension (ELS). In another embodiment, the lead suspension 224 is an integrated lead suspension (ILS) that is formed by a subtractive process. In yet another embodiment, the lead suspension 224 may be formed by an additive process, such as a Circuit Integrated Suspension (CIS). In a further embodiment, the lead suspension 224 may be a Flex-On Suspension (FOS) attached to base metal or it may be a Flex Gimbal Suspension Assembly (FGSA) that is attached to a base metal layer. However, it should be understood by those skilled in the art that the lead suspension 224 may be any form of lead suspension that can be used in a Data Access Storage Device (DASD), such as a hard disk drive (HDD).

In another embodiment, the lead suspension 224 has a spring-like quality, which biases or presses the air-bearing surface of the slider 221 against the magnetic storage medium 120 to cause the slider 221 to fly at a precise distance from the disk. The lead suspension 224 also has a hinge area that provides for the spring-like quality, and a flexing interconnect that supports read and write traces through the hinge area.

With reference still to FIG. 2, a voice coil 212, free to move within a conventional voice coil motor (VCM) magnet assembly (not shown), is also mounted to the actuator arm 210 opposite the head gimbal assembly 220. The voice coil motor (VCM) magnet assembly comprises a magnet located next to the voice coil 212 such that an electrical current traveling through the voice coil 212 generates a magnetic field through the coil 212, through a process of magnetic inductance, thus causing the actuator arm 210 to move relative to the pivot assembly 211. In one embodiment, the controller 150 is configured to control the current traveling through the voice coil 212 so as to control the rotation of the actuator arm 210 about the pivot assembly 211.

Movement of the actuator arm 210 (indicated by arrows 230) causes the head gimbal assembly 220 to move along radial arcs across tracks on the magnetic storage medium 120 until the magnetic read/write head settles on its set target track. The magnetic read/write transducer or head coupled with the slider 221 reads data from and magnetically writes data to data arrays comprising radially spaced data information tracks located on the surface of the magnetic storage medium 120. This type of movement of the actuator arm 210 is generally referred to as "single-stage actuation", because the slider, which is coupled with the actuator arm 210 by means of the head gimbal assembly 220, is rotated relative to the pivot assembly 211.

Another type of technology implements a system of "double-stage actuation" wherein operation of both the voice coil 212 and the microactuator 222 has a dynamic effect on the present location of the slider 221 relative to the magnetic storage medium 120. Specifically, the microactuator 222 is configured to operate as a small motor that accounts for the limited precision of movement offered by the voice coil 212 and accounts for the sway and other vibrations (generally, "disturbances") experienced by the slider 221, wherein such vibrations may be the result of, inter alia: (1) the inertia generated by the movement 230 of the actuator arm 210, and (2) the windage created by the high-speed rotation 131 of the magnetic storage medium 120. The microactuator 222 then adjusts for these factors by moving the slider 221 relative to the magnetic storage medium 120 such that the magnetic read/write head 310 is in a better position to magnetically read data from and magnetically write data to specific data arrays located on the surface of the magnetic storage medium 120.

A magnetic read/write head flies above the magnetic storage medium 120 at a transmission fly-height. The magnetic read/write head is configured to magnetically read data from and magnetically write data to data arrays comprising radially spaced data information tracks located on the surface of the magnetic storage medium 120. The ability of the magnetic read/write head to operate efficiently depends on the location of the read/write head relative to the magnetic storage medium 120. Therefore, changing the position of the slider 221 relative to the magnetic storage medium 120 will impact the operating efficiency of the drive 100.

Many modern day hard disk drives (HDDs) are implemented with "dual-stage" or "double-stage" actuators, such as depicted in FIG. 2, wherein an actuator arm rotates relative to a pivot assembly while a microactuator is employed to make tiny adjustments to the positioning of a slider in the head gimbal assembly (HGA) that is coupled with the rotating actuator arm. The "stroke" refers to the range of motion with which the microactuator can move the slider relative to a magnetic disk in the drive. In other words, stroke is the absolute correction range with which a microactuator can operate. It is beneficial for a head gimbal assembly (HGA) to have a relatively high degree of stroke so that the microactuator can better position the slider, and consequently the magnetic read/write head, over the data arrays on the surface of the magnetic disk. Thus, a higher degree of stroke translates into more efficient data transfer between the read/write head and the magnetic storage medium.

Dual-Stage Actuator

As mentioned, with a dual-stage actuator an actuator arm rotates (e.g., driven by a voice coil motor) relative to a pivot assembly while a microactuator is employed to make tiny adjustments to the positioning of a slider in the head gimbal assembly (HGA) that is coupled with the rotating actuator arm. Also as mentioned, there are numerous designs and forms of microactuators that can be implemented within a dual-stage actuator design, which are beyond the scope of this disclosure. A dual-stage actuator is typically controlled via a corresponding servo control system comprising a dual-stage loop.

Figure 3:
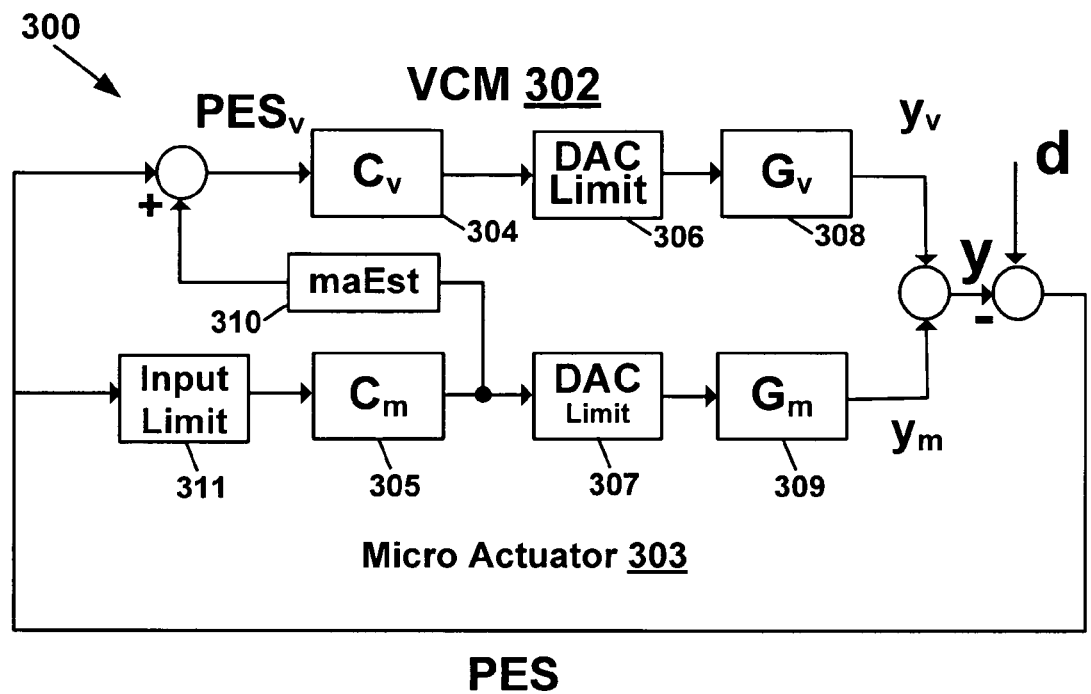
FIG. 3 is a block diagram illustrating a dual-stage servo control loop.

With reference now to FIG. 3, a block diagram of a dual-stage servo control loop 300 is illustrated. The dual-stage loop of FIG. 3 generally comprises a VCM loop 302 and a microactuator (MA) loop 303 (also referred to as the microactuator servo subsystem). The VCM actuator subsystem may also be referred to as the "primary actuator" and the microactuator subsystem may also be referred to as the "secondary actuator."

VCM loop 302 comprises a VCM controller 304 ($C_v$) leading to a VCM DAC (digital to analog converter) limit 306 leading to a VCM plant 308 ($G_v$), whose collaborative operation results in a VCM motion $y_v$. The VCM controller 304 typically comprises instructions and algorithms (e.g., transfer function) for controlling the movement of the VCM and, consequently, the movement of the HGA(s) and the corresponding slider(s) relative to the media, in response to an input signal such as a VCM position error signal ($PES_v$). A VCM DAC converts the digital signal output from the VCM controller 304 to a corresponding analog signal, which is provided to the VCM plant 308. The VCM DAC limit 306 is a limit applied to or within the VCM DAC. The VCM plant 308 comprises the driver and hardware corresponding to the VCM, and which enacts the VCM motion $y_v$.

Microactuator (MA) loop 303 comprises a microactuator (MA) controller 305 ($C_m$) leading to a microactuator (MA) DAC limit 307 leading to a microactuator (MA) plant 309 (Gm), whose collaborative operation results in a microactuator motion $y_m$, relative to the VCM motion $y_v$. The MA controller 305 typically comprises instructions and algorithms (e.g., transfer function) for controlling the movement of the microactuator and, consequently, the movement of the slider(s) relative to the media, in response to an input signal such as a position error signal (PES). A MA DAC converts the digital signal output from the MA controller 305 to a corresponding analog signal, which is provided to the MA plant 309. The MA DAC limit 307 is a limit applied to or within the MA DAC. The MA plant 309 comprises the driver and hardware corresponding to the microactuator. The VCM motion $y_v$ and microactuator motion $y_m$ are summed to result in a combined dual-stage actuator motion y. Any lump sum disturbances, i.e., a combination of all disturbances, is summed with dual-stage actuator motion y to generate PES for feedback to each loop in the dual-stage loop.

Another component of the dual-stage loop 300 is microactuator estimator ($MA_{est}$) 310, which outputs an estimate of the microactuator motion $y_m$, referred to as $\hat{y}_m$ (or "$y_m$hat"). The value of $\hat{y}_m$ that is output by MA estimator 310 is summed with the PES to arrive at the $PES_v$ for input to the VCM controller 304.

A microactuator device typically has a very limited stroke (e.g., a few tracks), so the microactuator saturation should be handled carefully. In dual-stage servo designs, saturation limits are typically applied, if at all, at each of the controller outputs before the corresponding DACs to prevent wrap-around in both VCM and microactuator loops. However, large PESs during seeks at the input of the microactuator controller 305 cause the controller's internal states to accumulate excessively. This over-accumulation of internal states leads to a longer adjustment time to reach the final target position, because internal states have to come back from overly accumulated initial values, i.e., overshoot.

Approaches to Over-Accumulation of Internal States

Reference Limit Approach

One approach to lessening the detrimental impact of state over-accumulation is to add a limit at the microactuator controller 305 input. However, deciding the appropriate value for the input is difficult and the value itself is controller-dependent. To make sure the internal states of the microactuator saturate at the same time as the mechanical output of the microactuator, the input limit should approximate a ratio of the microactuator DAC limit 307 and the microactuator controller 305 output signal. Thus, in cases in which the microactuator controller 305 outputs a high gain signal at low frequencies, or operates simply as an integrator, the input limit has to be very small to sufficiently prevent the excessively accumulated internal states. If the limit is set this way, i.e., as an input limit, the benefit of a fast response by the microactuator is significantly compromised, which results in a sluggish response. For example, with the input limit approach, even with an input PES that is within the microactuator's stroke capability, because of the small input limit needed to avoid over-accumulation at a high gain controller output, the microactuator response is sluggish. This is because the microactuator only sees a small portion of the PES due to the small input limit that significantly limits the input signal to the microactuator controller 305.

Figure 4:
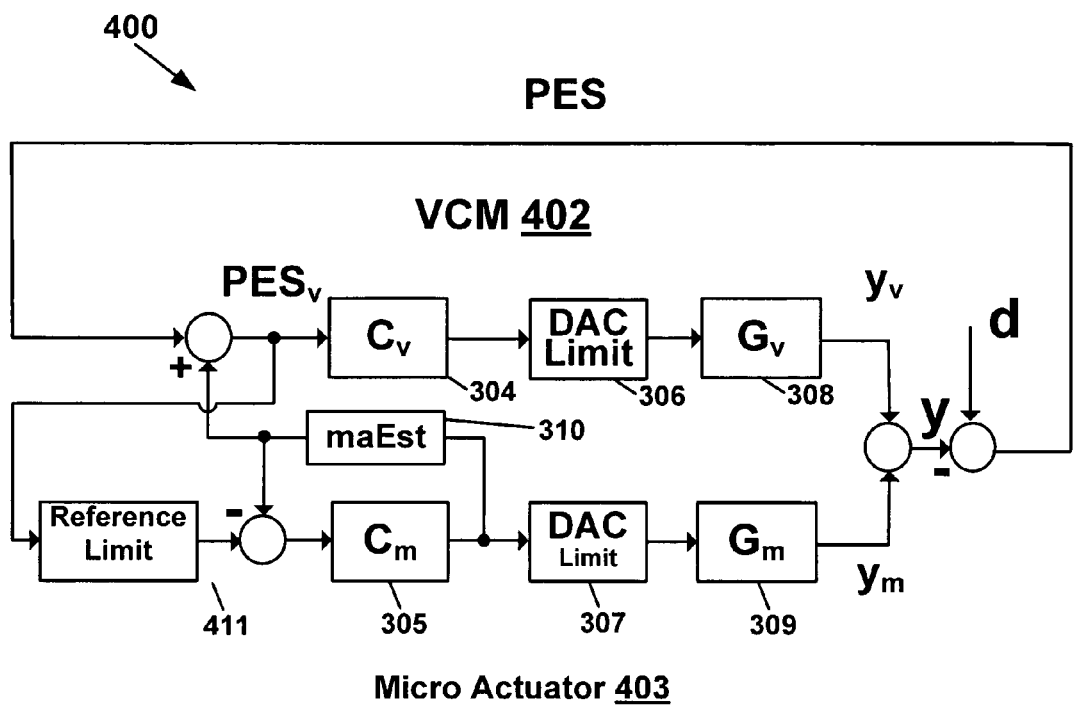
FIG. 4 is a block diagram illustrating a de-coupled dual-stage servo control loop comprising a reference limit, according to an embodiment of the present invention.

A better approach to lessening the detrimental impact of state over-accumulation, according to an embodiment of the present technology, is to take advantage of the alternative construction of the de-coupled dual-stage servo loop as illustrated in FIG. 4. FIG. 4 is a block diagram illustrating a de-coupled dual-stage loop 400 comprising a reference limit, according to an embodiment of the present technology. The dual-stage loop of FIG. 4 generally comprises a VCM loop 402 and a microactuator (MA) loop 403 (also referred to as the microactuator servo subsystem).

The VCM loop 402 generally comprises the same components and construction as the VCM loop 302 illustrated in FIG. 3. Therefore, for purposes of brevity and clarity, the detailed description of the components and construction of VCM 402 is not repeated here.

One difference between the dual-stage loop 300 of FIG. 3 and the dual-stage loop 400 of FIG. 4 is that the $PES_v$ branches and is routed away from the VCM controller 304 in addition to being input to the VCM controller 304. As illustrated in FIG. 4, the $PES_v$ is routed to a reference limit 411, according to this embodiment. In linear mode, the dual-stage loop 400 is essentially mathematically identical to the dual-stage loop 300. That is, the VCM loop is essentially unchanged, while the microactuator controller 305 input is still the PES.

However, when a limit is needed to prevent over-accumulation of internal states, a reference limit 411 is applied at the "reference" point of the microactuator loop 403. Furthermore, the value of $\hat{y}_m$ that is output by MA estimator 310 is not only summed with the PES to arrive at the $PES_v$ for input to the VCM controller 304, but $\hat{y}_m$ is also combined with the reference limit 411 to arrive at the input for the microactuator controller 305. According to one embodiment, the reference limit 411 is set to correspond to the actual maximum physical DC stroke of the microactuator, thereby preventing over-accumulation of internal states and microactuator saturation. One benefit of this loop construction illustrated in FIG. 4 is that the reference limit 411 serves as a set-point limit to the microactuator. Hence, the servo system automatically guarantees that all the internal states of the microactuator loop 403 will not over-react because any relatively large PES is not eve acknowledged by the microactuator loop 403. Conceptually, the dual-stage loop 400 allows the VCM loop 402 to operate as best as it can to move the slider to its intended target over the media, and uses the residual error from the VCM (i.e., the precision that is not achievable by the VCM) as a reference set-point to the microactuator loop 403 in order to further follow up with more precisely locating the slider to its intended target.

The remainder of the microactuator loop 403 is similarly constructed as the microactuator loop 303 of FIG. 3. Likewise, the microactuator loop 403 generally operates similarly as the microactuator loop 303 of FIG. 3, except of course for the difference in input signal and output signal associated with the microactuator controller 305 due to the application of the reference limit 411 into the microactuator loop 403. That is, the microactuator controller 305, the DAC limit 307, and the microactuator plant 309 of FIG. 4 are constructed similarly and operate similarly as the microactuator controller 305, the DAC limit 307, and the microactuator plant 309 of FIG. 3. Therefore, for purposes of brevity and clarity, the detailed description of the components and construction of microactuator loop 403 is not repeated here. In such a microactuator loop 403, it is preferable that the DAC/driver design satisfies the relation that the product of the MA DAC limit 307 and the MA plant 309 is equal to or approximates the maximum physical DC stroke of the microactuator.

FIG. 5 is a flow diagram illustrating a process for controlling a de-coupled dual-stage servo control loop comprising a reference limit, according to an embodiment of the present invention. The process of FIG. 5 is described with further reference to the block diagram of FIG. 4. The process of FIG. 5 may be implemented, for example, in firmware associated with a circuit board constituent to an HDD device, in software executed by a processor within an HDD device, and the like.

In the dual-stage loop 400 illustrated in FIG. 4, the primary VCM loop 402 operates similarly as the VCM loop 302 illustrated in FIG. 3. That is, an actuator motion, y, is generated based on a primary actuator motion, $y_v$, and a secondary actuator motion, $y_m$. Hence, the actuator motion combines both the VCM driven motion as well as the microactuator driven motion. The actuator motion, y, is then combined with any disturbance(s), d, to generate a position error signal, PES. In the primary actuator servo loop, VCM loop 402, an input signal $PES_v$ to the primary actuator controller 304 is generated based on summing or otherwise combining the PES and the signal corresponding to an estimated motion of the secondary actuator $\hat{y}_m$ output from the MA estimator 310. Further, the primary actuator controller input signal is sent to the primary actuator controller 304, from which a primary actuator control signal is generated, which is sent on for operation with the DAC limit 306 and then the VCM plant 308.

According to one embodiment, in the dual-stage loop 400 illustrated in FIG. 4, the secondary microactuator loop 403 operates according to block 502 of FIG. 5. At block 502, an input signal to the secondary actuator controller 305 is generated based on the primary actuator controller input signal $PES_v$, the estimated secondary actuator motion signal $\hat{y}_m$ from MA estimator 310, and a secondary actuator controller reference limit 411. According to one embodiment, the secondary actuator controller reference limit 411 corresponds to the maximum physical stroke of the secondary, or micro-, actuator. Consequently, over-accumulation of internal states of controller 305 is prevented, as described herein, when the secondary actuator controller input signal is sent to the secondary actuator controller 305 for generation of a secondary actuator control signal, at block 504.

Variable Input Limit Approach

Figure 6:
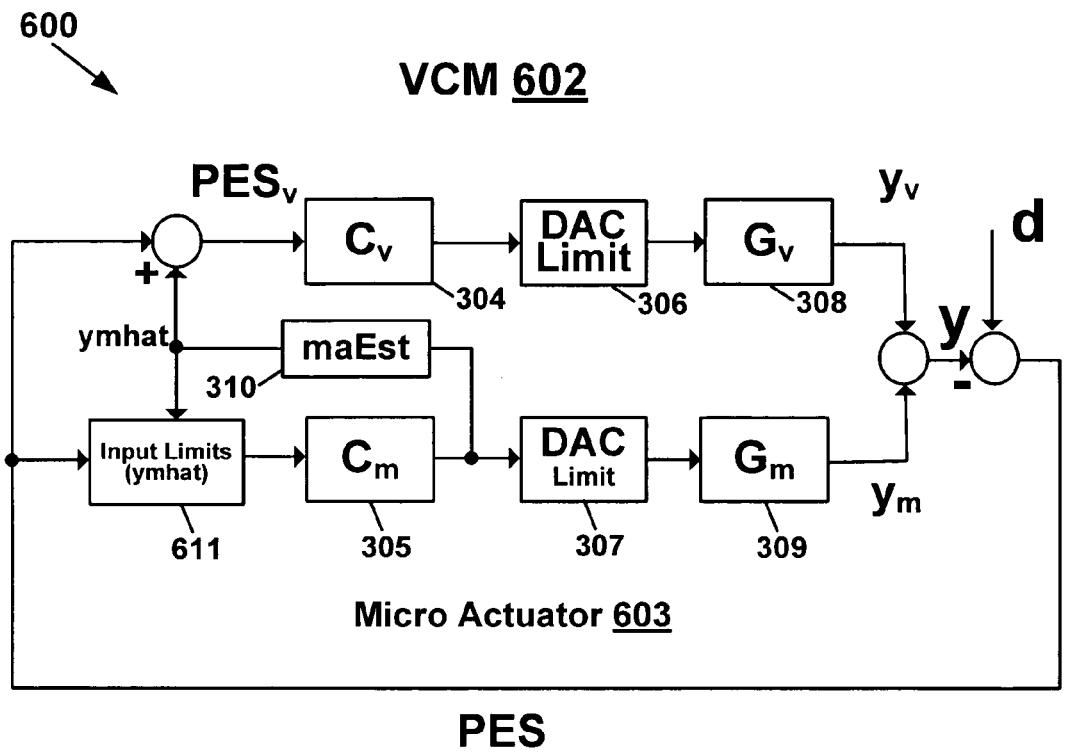
FIG. 6 is a block diagram illustrating a dual-stage servo control loop comprising a variable input limit, according to an embodiment of the present invention.

Another approach to lessening the detrimental impact of state over-accumulation, according to an embodiment of the present technology, is to take advantage of the construction of the dual-stage servo loop as illustrated in FIG. 6. FIG. 6 is a block diagram illustrating a dual-stage loop 600 comprising a variable input limit, according to an embodiment of the present technology. The dual-stage loop of FIG. 6 generally comprises a VCM loop 602 and a microactuator (MA) loop 603.

The VCM loop 602 generally comprises the same components and construction as the VCM loops 302 and 402 illustrated in FIGS. 3 and 4, respectively. Therefore, for purposes of brevity and clarity, the detailed description of the components and construction of VCM 602 is not repeated here.

One difference between the dual-stage loop 300 of FIG. 3 and the dual-stage loop 600 of FIG. 6 is that the value of $\hat{y}_m$ that is output by MA estimator 310 is not only combined with the PES to arrive at the $PES_v$ for input to the VCM controller 304, but $\hat{y}_m$ is also used to generate the variable input limit 611 for input to the microactuator controller 305.

According to one embodiment, the variable input limit 611 is equal to or approximates the difference between the maximum physical DC stroke of the microactuator and the estimated value of the microactuator motion, i.e., the value of $\hat{y}_m$. Hence, when the microactuator has a small motion the input limit 611 to the microactuator controller 305 equals or approximates the value corresponding to the maximum physical DC stroke of the microactuator. Likewise, the input limit 611 to the microactuator controller 305 gradually decreases to zero in correlation with the value of $\hat{y}_m$ approaching the value corresponding to the maximum physical DC stroke of the microactuator. Such a microactuator loop 603 ensures that the microactuator is at full capacity when it has not yet moved much. Meanwhile, as the microactuator moves closer to its maximum physical stroke, the input limit 611 is dynamically adjusted to a lesser value until reaching zero limit. As with the microactuator loop 403 of FIG. 4, the microactuator loop 603 of FIG. 6 ensures that no internal states of the microactuator controller 303 are excessively accumulated, even when the controller operates as an integrator.

FIG. 7 is a flow diagram illustrating a process for controlling a dual-stage servo control loop comprising a variable input limit, according to an embodiment of the present invention. The process of FIG. 7 is described with further reference to the block diagram of FIG. 6. The process of FIG. 7 may be implemented, for example, in firmware associated with a circuit board constituent to an HDD device, in software executed by a processor within an HDD device, and the like.

In the dual-stage loop 600 illustrated in FIG. 6, the primary VCM loop 602 operates similarly as the VCM loop 302 illustrated in FIG. 3. That is, an actuator motion, y, is generated based on a primary actuator motion, $y_v$, and a secondary actuator motion, $y_m$. Hence, the actuator motion combines both the VCM driven motion as well as the microactuator driven motion. The actuator motion, y, is then combined with any disturbance(s), d, to generate a position error signal, PES. In the primary actuator servo loop, VCM loop 602, an input signal $PES_v$ to the primary actuator controller 304 is generated based on summing or otherwise combining the PES and the signal corresponding to an estimated motion of the secondary actuator $\hat{y}_m$ output from the MA estimator 310. Further, the primary actuator controller input signal is sent to the primary actuator controller 304, from which a primary actuator control signal is generated, which is sent on for operation with the DAC limit 306 and then the VCM plant 308.

According to one embodiment, in the dual-stage loop 600 illustrated in FIG. 6, the secondary microactuator loop 603 operates according to block 702 of FIG. 7. At block 702, an input signal to the secondary actuator controller 305 is generated based on the main PES, the estimated secondary actuator motion signal $\hat{y}_m$ from MA estimator 310, and a variable secondary actuator controller input limit 611. According to one embodiment, the variable (e.g., dynamically generated) secondary actuator controller input limit 611 is based on the difference between a signal corresponding to the maximum physical stroke of the secondary actuator and the estimated secondary actuator motion signal $\hat{y}_m$. Consequently, over-accumulation of internal states of controller 305 is prevented, as described herein, when the secondary actuator controller input signal is sent to the secondary actuator controller 305 for generation of a secondary actuator control signal, at block 704.

It should be understood that although various embodiments of the present invention are described in the context of rotating a slider relative to a magnetic storage medium in a hard disk drive (HDD), the foregoing embodiments are merely exemplary of various implementations of principles of the present technology. Therefore, it should be understood that various embodiments of the present invention may apply to any devices, configurations, or systems in which a first object needs to be rotated relative to a second object.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for controlling a dual-stage actuator comprising a primary actuator and a secondary actuator, said dual-stage actuator comprising a primary actuator servo loop for controlling the motion of the primary actuator and a secondary actuator servo loop for controlling the motion of the secondary actuator, said method comprising:

generating an actuator motion based on a primary actuator motion and a secondary actuator motion;

generating a position error signal based on said actuator motion and a system disturbance;

in said primary actuator servo loop,
generating a primary actuator controller input signal based on summing said position error signal and an estimated secondary actuator motion signal, and
sending said primary actuator controller input signal to a primary actuator controller for generating a primary actuator control signal;

in said secondary actuator servo loop,
generating a secondary actuator controller input signal based on said primary actuator controller input signal, said estimated secondary actuator motion signal, and a secondary actuator controller reference limit, and
sending said secondary actuator controller input signal to a secondary actuator controller for generating a secondary actuator control signal;

wherein said secondary actuator controller reference limit corresponds to the maximum physical stroke of said secondary actuator.

2. The method of claim 1, wherein said primary actuator comprises a voice coil motor driver and said secondary actuator comprises a microactuator driver both constituent to a hard disk drive (HDD) device and said method is performed by said HDD device.

3. A computer-readable medium having instructions stored thereon for controlling a dual-stage actuator comprising a primary actuator and a secondary actuator, said dual-stage actuator comprising a primary actuator servo loop for controlling the motion of the primary actuator and a secondary actuator servo loop for controlling the motion of the secondary actuator, said instructions which, when executed by one or more processors, cause performance of:

generating an actuator motion based on a primary actuator motion and a secondary actuator motion;

generating a position error signal based on said actuator motion and a system disturbance;

in said primary actuator servo loop,
generating a primary actuator controller input signal based on summing said position error signal and an estimated secondary actuator motion signal, and
sending said primary actuator controller input signal to a primary actuator controller for generating a primary actuator control signal;

in said secondary actuator servo loop,
generating a secondary actuator controller input signal based on said primary actuator controller input signal, said estimated secondary actuator motion signal, and a secondary actuator controller reference limit, and
sending said secondary actuator controller input signal to a secondary actuator controller for generating a secondary actuator control signal;

wherein said secondary actuator controller reference limit corresponds to the maximum physical stroke of said secondary actuator.

4. The computer-readable medium of claim 3, wherein said primary actuator comprises a voice coil motor driver and said secondary actuator comprises a microactuator driver both constituent to a hard disk drive (HDD) device and said having instructions stored thereon are executed by said HDD device.

5. A hard disk drive (HDD) device comprising:

a housing;

a magnetic storage medium coupled with said housing, said magnetic storage medium rotating relative to said housing;

an actuator arm coupled with said housing, said actuator arm moving relative to said magnetic storage medium;

a slider assembly comprising a magnetic read/write head that magnetically writes data to and magnetically reads data from said magnetic storage medium;

a microactuator coupled with said actuator arm and said slider assembly, said microactuator applying a motion to said slider assembly to rotate said slider assembly relative to said magnetic storage medium;

one or more processors; and a microactuator servo subsystem for controlling said motion, said microactuator servo subsystem comprising a microactuator controller and instructions which, when executed by said one or more processors, prevent over-accumulation of internal states of said microactuator controller, said instructions, when executed, cause performance of:

generating a micractuator controller input signal based on a primaryy actuator controller input signal an estimated microactuator motion signal and a microactuator controller reference limit and sending said microactuator controller input signal to said microactuator controller for generating a microactuator control signal;

wherein said microactuator controller reference limit corresponds to the maximum physical stroke of said microactuator.

6. The hard disk drive (HDD) device of claim 5, wherein said instructions, when executed, cause performance of:

generating a microactuator controller input signal based on a position error signal, an estimated microactuator motion signal, and a variable microactuator controller input limit, and sending said microactuator controller input signal to said microactuator controller for generating a microactuator control signal;

wherein said microactuator controller input limit is based on the difference between a signal corresponding to the maximum physical stroke of said microactuator and said estimated microactuator motion signal.

* * * * *

UNITED STATES PATENT AND TRADEMARK OFFICE
CERTIFICATE OF CORRECTION

PATENT NO. : 7,595,956 B2  Page 1 of 1
APPLICATION NO. : 12/006329
DATED : September 29, 2009
INVENTOR(S) : Wei Guo and Xiaoping Hu It is certified that error appears in the above-identified patent and that said Letters Patent is hereby corrected as shown below:

Col. 13, Claim 5, Line 2 currently reads "a primaryy actuator controller input signal an estimated"
Should read -- a primary actuator controller input signal, an estimated --

Col. 13, Claim 5, Line 3 currently reads "microactuator motion signal and a microactuator con-"
Should read -- microactuator motion signal, and a microactuator con- --

Col. 13, Claim 5, Line 4 currently reads "troller reference limit and"
Should read -- troller reference limit, and --

Signed and Sealed this

Twenty-third Day of February, 2010

David J. Kappos
*Director of the United States Patent and Trademark Office*